United States Patent [19]
Kurisu et al.

[11] Patent Number: 4,733,998
[45] Date of Patent: Mar. 29, 1988

[54] METHOD AND APPARATUS FOR MACHINING THE SIDE EDGE SURFACE OF A WEB PLATE

[75] Inventors: Shingo Kurisu; Shunji Omori; Hiroyuki Takenaka; Tsuneo Egawa, all of Hiroshima; Takuro Mitsunaga; Nobuo Kiyama, both of Mihara, all of Japan

[73] Assignee: Mitsubishi Jukogyo Kabushiki Kaisha, Tokyo, Japan

[21] Appl. No.: 643,309

[22] Filed: Aug. 22, 1984

[30] Foreign Application Priority Data

Oct. 24, 1983 [JP] Japan ................ 58-197577

[51] Int. Cl.$^4$ ............... B21B 15/00; B23C 3/12
[52] U.S. Cl. ..................... 409/132; 409/138; 409/157
[58] Field of Search ......... 409/85, 131, 132, 137, 409/138, 139, 140, 204, 216, 228, 229, 234, 293, 201, 157; 29/527.6, 557, 558, 564.7, 815; 83/869, 432

[56] References Cited
U.S. PATENT DOCUMENTS

| | | | |
|---|---|---|---|
| 2,191,559 | 2/1940 | Drummond | 409/132 |
| 2,200,544 | 5/1940 | Drummond | 409/132 |
| 2,206,770 | 7/1940 | Drummond | 409/131 |
| 3,117,477 | 1/1964 | Cardell | 409/138 |
| 3,377,896 | 4/1968 | Corta | 409/138 |
| 3,977,298 | 8/1976 | Linsinger | 409/138 |
| 4,177,699 | 12/1979 | Dovnar et al. | 409/132 X |

Primary Examiner—Z. R. Bilinsky
Attorney, Agent, or Firm—Wenderoth, Lind & Ponack

[57] ABSTRACT

A side edge surface of a web plate is trimmed or machined after by feeding a milling cutter into the side edge surface of the web plate, which cutter has on its outer peripheral surface cutting edges at a predetermined angle with respect to its rotary axis, and driving the milling cutter in rotation. The rotary axis of the milling cutter is inclined in a plane which is kept parallel to a desired machined surface of the side edge surface of the web plate, and the angle formed between the cutting edge of the milling cutter and the side edge surface of the web plate is limited to within 55 degrees to 125 degrees.

5 Claims, 5 Drawing Figures

METHOD AND APPARATUS FOR MACHINING THE SIDE EDGE SURFACE OF A WEB PLATE

The present invention relates to a method for side-trimming a web plate by means of a cutter, which contemplates increase of the life of a tool and improvement in the precision of a machined surface.

Figure 1:
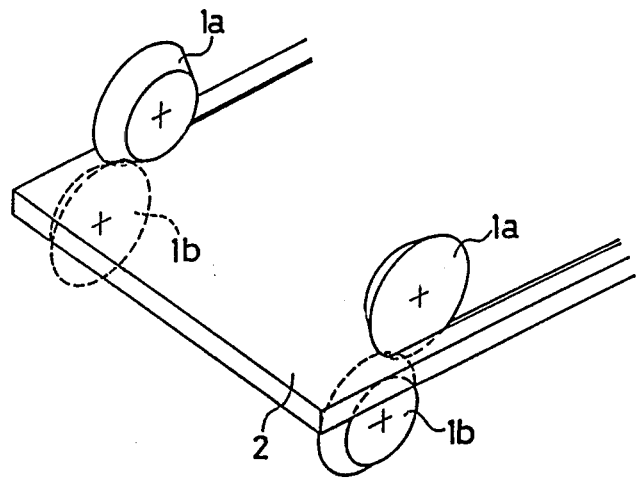

In a web processing installation such as a steel plate rolling line or the like, there is provided a trimming step for cutting opposite side edge portions of a web plate in order to make the width of the web plate constant. Heretofore, among those known as side trimmers for cutting the opposite side edge portions of such web plate, a structure as shown in FIG. 1 exists, in which a web plate 2 is pinched by a pair of circle cutters 1a and 1b so as to cut the web plate. In this side-trimmer making use of the circle cutters 1a and 1b, the cutting edges of the circle cutters 1a and 1b in the shearing portion would be opened in the widthwise direction due to shearing forces, and even if a rigidity of the circle cutters 1a and 1b is enhanced, a cutting margin of at least 1 millimeter to 2 millimeters or more is necessary in the case where the web plate 2 is a hot rolled steel plate, which becomes one of the causes for bringing about lowering of a yield.

Hence, a side-trimmer relying upon cutting by means of a milling cutter has been proposed (reference should be made to, for instance, Japanese Patent Publication No. 58-34245), and thereby it has become possible to set the cutting margin at a very small value. However, since a traveling speed of the web plate 2 is as high as 100 m/min. to 400 m/min. and also the thickness of the web plate 2 is as thin as about 3 millimeters in average, burrs would arise on the machined surface and the milling cutter would be worn in a short period of time, so that the proposed side-trimmer was poor in practicability.

It is therefore an object of the present invention to provide a novel method for trimming, in which the shortcomings of the above-mentioned side-trimmer in the prior art relying upon cutting by making use of a milling cutter are eliminated, and which contemplates improvement in the precision of a machined surface and increase of the life of a tool.

According to one feature of the present invention, there is provided a method for side-trimming a web plate, in which a side edge surface of the web plate is machined by feeding a cutter into the side edge surface of the web plate, which cutter has on its outer peripheral surface, cutting edges at a predetermined angle with respect to its rotary axis, with the rotary axis of the cutter inclined so that the angle formed between the cutting edge of the cutter and the side edge surface of the web plate may fall within the range of 55 degrees to 125 degrees, while the rotary axis of the milling cutter is inclined in a plane which is either parallel to a desired machined surface of the side edge surface of the web plate perpendicular to the upper or lower surface of said web plate, and driving the cutter in rotation.

Therefore, according to the present invention, since the rotary axis of the cutter is inclined while being kept parallel to a desired machined surface of the edge surface of the web plate, the side edge surface of the web plate can be cut by means of the entire width of the cutting edges, and hence it is possible to make the cutting load uniform and also to prolong the life of a tool. In addition, since the cutting edge is disposed so as to be nearly at right angles to the direction of travel of the web plate, burrs would not generated on the cut surface, but even if burrs should be generated they would be very few, and moreover, owing to the fact that the cutting is effected in the direction of travel of the web plate in which direction the rigidity of the web plate is highest, flexure of the web plate is almost not present, so that improvement in the precision of a machined surface can be contemplated and also there is no fear of damaging a tool due to frictional vibration.

Figure 2:
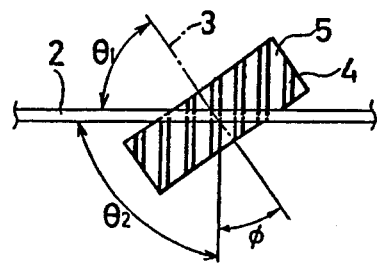
Figure 3:
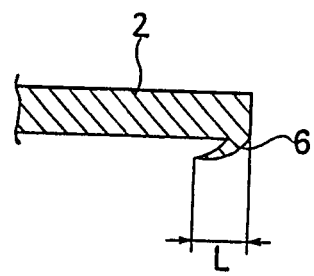
Figure 4:
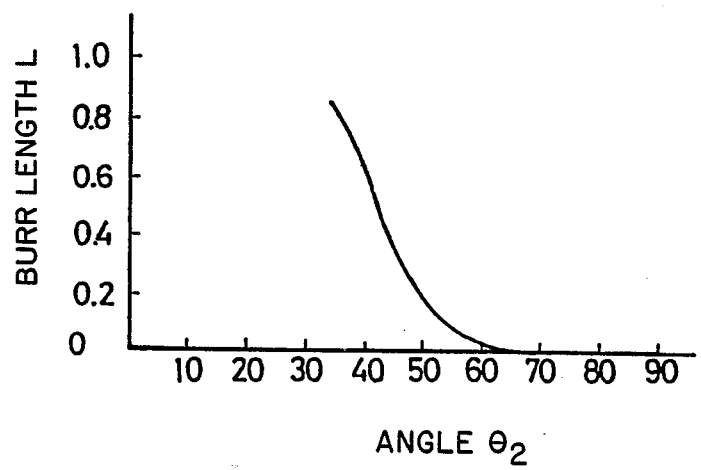
Figure 5:
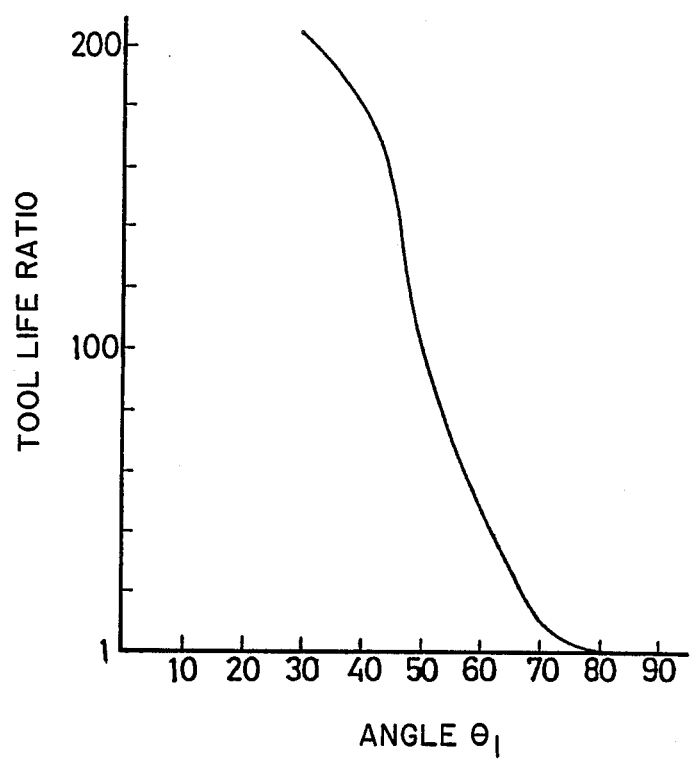

The above-mentioned and other objects, features and advantages of the present invention will become more apparent by reference to the following description of a preferred embodiment of the present invention taken in conjunction with the accompanying drawings, wherein:

FIG. 1 is a schematic perspective view showing an operation prinicple of a side-trimmer in the prior art, FIG. 2 is a schematic side view showing an operation principle in a method for side-trimming a web plate according to the present invention, FIG. 3 is a cross-section view of one side edge portion of a trimmed web plate, FIG. 4 is a diagram showing the relation of an angle formed between a web plate and a cutting edge versus a length of a burr, and FIG. 5 is a diagram showing the relation of an angle formed between a rotary axis of a cutter and a web plate versus a tool life ratio.

Now the operation principle in the method of side-trimming a web plate according to the present invention will be described with reference to FIG. 2. A cutter 5 having its cutting edges 4 on the outer peripheral surface at an angle $\phi$ with respect to an axis 3 of a rotary shaft which is attached to means for feeding and means for rotating a cutter 5 such as, for example, a twisted-edge cylindrical plain milling cutter or the like is employed, and the cutter 5 is set by means attached to the rotary shaft for orienting the cutter 5 in such manner that the axis 3 of the cutter 5 is inclined by an angle $\theta_1$ with respect to a web plate 2 and an angle $\theta_2$ lying in a plane containing the longitudinally extending side edge surface of the web plate and formed between the cutting edge 4 and the web plate 2 may fall within the range of $55° \leq \theta_2 \leq 125°$. The reason for such limitation is as follows. That is, if the angle $\theta_2$ is made too small or too large, then a burr 6 will be generated at the edge portion of the web plate 2 having an upper and lower surface as shown in FIG. 3 which shows a cross-section configuration of a machined portion of the web plate 2, and as seen in FIG. 4 which shows a relation of a length L of the burr 6 versus the angle $\theta_2$, the length L of the burr 6 can be deemed to be nearly zero within the range of $55° \leq \theta_2 \leq 90°$. It has been also confirmed that this small value of the length L is quite equally realized in the range of $90° \leq \theta_2 \leq 125°$. It is to be noted that these data are the values obtained in the case where a web plate 2 of 2.6 millimeters in thickness was conveyed by suitable means at a speed of 400 m/min. and cut at a cutting speed of 200 m/min. with the axis 3 of the cutter 5 inclined by an angle $\theta_1$ of 45 degrees, and a cutting depth was set at 3 millimeters.

On the other hand, the relation of a tool life ratio taking a value 1 in the case of setting the angle $\theta_1$ at 90 degrees versus the angle $\theta_1$ is shown in FIG. 5. However, these data are the values obtained in the case where the above-described web plate 2 of 2.6 millimeters in thickness was conveyed at a speed of 400 m/min., a cutting speed of the cutter 5 whose angle $\theta_2$ was set at 90 degrees, was set at 200 m/min., and the cutting depth was set at 5 millimeters. As will be obvious from this diagram, a life of the cutter 5 can be prolonged by setting the angle $\theta_1$ in the range of $\theta_1 \leq 70°$. According to the present invention, as will be apparent from FIG. 2, since the cutting edge 4 has a cutting speed component in its lengthwise direction (in the vertical direction as viewed in FIG. 2), a substantial rake angle of the cutting edge 4 becomes larger than the original rake angle of the cutter 5, resulting in that generation of the burrs 6 is reduced, also a cutting force is decreased and the large rake angle serves more advantageously in view of the life of a tool. It is to be noted that if the angle $\theta_1$ is chosen to be 5 degrees or less, then the width of the cutting edge 4 must be set very long and practical use thereof becomes difficult, and therefore, the lower limit of the angle $\theta_1$ should be preferably set at about 5 degrees. In addition, the cutter 5 may be reciprocated by means adapted for moving the cutter 5 in the direction parallel to the axis 3 during the machining or when machining is not effected, then the width of the cutting edges 4 is used further effectively, and so, such mode of operation is more advantageous in view of the life of a cutter 5.

While a principle of the present invention has been described above in connection to one preferred embodiment of the invention, it is a matter of course that many changes and modifications can be made to the illustrated embodiment without departing from the spirit of the present invention.

What is claimed is:

1. A method of machining a longitudinally extending side edge surface of a web plate having an upper and lower surface, comprising:
   providing a rotary cutter having cutting edges on a radially outer peripheral surface of said cutter which are at a predetermined angle with respect to the rotary axis of said cutter;
   orienting said cutter with respect to said web plate by having the rotary axis of said cutter inclined at a first angle for forming a second angle between the cutting edges and the longitudinal corner edge of the longitudinally extending side edge of said web plate to be machined, said second angle lying in a plane containing said longitudinally extending side edge surface and being within the range of 55 degrees to 125 degrees, and;
   rotating said rotary cutter in rotation, while moving said cutter and said web plate relative to each other for moving the longitudinally extending side edge surface of said web plate into contact with said radially outer peripheral surface of said cutter and past said cutter, whereby the longitudinally extending side edge surface of a web plate is machined.

2. The method of claim 1 wherein said rotary axis of said cutter is inclined in a plane which is perpendicular to the upper or the lower surface of said web plate.

3. The method of claim 1 wherein said cutter is moved in a direction parallel to said rotary axis of said cutter during machining or when machining is not effected, whereby more effective use is made of the cutting edges and the life of said rotary cutter is increased.

4. A method of machining the side edge surface of a web plate having an upper and lower surface, comprising:
   providing a rotary cutter having cutting edges on the outer peripheral surface of said cutter which are at a predetermined angle with respect to the rotary axis of said cutter, said rotary axis of said cutter being inclined in a plane which is parallel to a desired machined edge surface of said web plate;
   orienting said cutter with respect to said web plate by having the rotary axis of said cutter inclined at a first angle for forming a second angle between the cutting edges and the longitudinal corner edge of the side edge of said web plate to be machined, said second angle being within the range of 55 degrees to 125 degrees, and;
   rotating said rotary cutter in rotation, while moving said cutter and said web plate relative to each other, for moving the side edge surface of said web plate past said cutter, whereby the side edge surface of a web plate is machined.

5. The method of claim 4, wherein said first angle is formed between said rotary axis and the longitudinal corner edge of the side edge of said web plate to be machined, said first angle being within the range of 5 degrees to 70 degrees.

* * * * *

REEXAMINATION CERTIFICATE (1240th)
United States Patent [19]
Kurisu et al.

[11] B1 4,733,998
[45] Certificate Issued    Apr. 3, 1990

[54] METHOD AND APPARATUS FOR MACHINING THE SIDE EDGE SURFACE OF A WEB PLATE

[75] Inventors: Shingo Kurisu; Shunji Omori; Hiroyuki Takenaka; Tsuneo Egawa, all of Hiroshima; Takuro Mitsunaga; Nobuo Kiyama, both of Mihara, all of Japan

[73] Assignee: Mitsubishi Jukogyo Kabushiki Kaisha, Tokyo, Japan

Reexamination Request:
No. 90/001,628, Oct. 27, 1988

Reexamination Certificate for:
Patent No.: 4,733,998
Issued: Mar. 29, 1988
Appl. No.: 643,309
Filed: Aug. 22, 1984

[30] Foreign Application Priority Data
Oct. 24, 1983 [JP] Japan ................. 58-197577

[51] Int. Cl.$^4$ ................... B21B 15/00; B23C 3/12
[52] U.S. Cl. ..................... 409/132; 409/138; 409/157

[58] Field of Search .......... 409/85, 131, 132, 137–140, 409/204, 216, 228, 229, 234, 293, 157, 201; 29/527.6, 557, 558, 564.7, 815; 83/432, 869; 51/283 E

[56] References Cited
U.S. PATENT DOCUMENTS
3,599,531  8/1971  Wright et al. .

FOREIGN PATENT DOCUMENTS
58-34245   7/1983  Japan .
1492932   11/1973  United Kingdom .

*Primary Examiner*—Z. R. Bilinsky
*Attorney, Agent, or Firm*—Wenderoth, Lind & Ponack

[57] ABSTRACT

A side edge surface of a web plate is trimmed or machined after by feeding a milling cutter into the side edge surface of the web plate, which cutter has on its outer peripheral surface cutting edges at a predetermined angle with respect to its rotary axis, and driving the milling cutter in rotation. The rotary axis of the milling cutter is inclined in a plane which is kept parallel to a desired machined surface of the side edge surface of the web plate, and the angle formed between the cutting edge of the milling cutter and the side edge surface of the web plate is limited to within 55 degrees to 125 degrees.

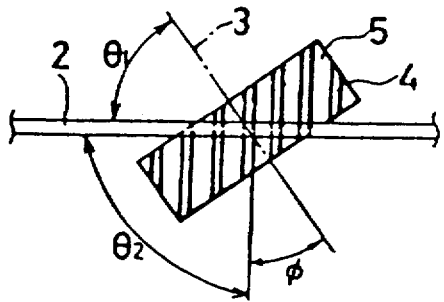

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 29–61:

Now the operation principle in the method of side-trimming a web plate according to the present invention will be described with reference to FIG. 2. A cutter 5 having its cutting edges 4 on the outer peripheral surface at an angle $\phi$ *other than 90°* with respect to an axis 3 of a rotary shaft which is attached to means for feeding and means for rotating a cutter 5 such as, for example, a twisted-edge cylindrical plain milling cutter or the like is employed, and the cutter 5 is set by means attached to the rotary shaft for orienting the cutter 5 in such manner that the axis 3 of the cutter 5 is inclined by an angle $\theta_1$ *other than 90°* with respect to a web plate 2 and an angle $\theta_2$ lying in a plane containing the longitudinally extending side edge surface of the web plate and formed between the cutting edge 4 and the web plate 2 may fall within the range of $55° \leq \theta_2 \leq 125°$. The reason for such limitation is as follows. That is, if the angle $\theta_2$ is made too small or too large, then a burr 6 will be generated at the edge portion of the web plate 2 having an upper and lower surface as shown in FIG. 3 which shows a cross-section configuration of a machined portion of the web plate 2, and as seen in FIG. 4 which shows a relation of a length L of the burr 6 versus the angle $\theta_2$, the length L of the burr 6 can be deemed to be nearly zero within the range of $55° \leq \theta_2 \leq 90°$. It has been also confirmed that this small value of the length L is quite equally realized in the range of $90° \leq \theta_2 \leq 125°$. It is to be noted that these data are the values obtained in the case where a web plate 2 of 2.6 millimeters in thickness was conveyed by suitable means at a speed of 400 m/min. and cut at a cutting speed of 200 m/min. with the axis 3 of the cutter 5 inclined by an angle $\theta_1$ of 45 degrees, and a cutting depth was set at 3 millimeters.

AS A RESULT OF REEXAMINATION, IT HAS BEEN DETERMINED THAT:

Claims 1, 4 and 5 are determined to be patentable as amended.

Claims 2 and 3, dependent on an amended claim, are determined to be patentable.

1. A method of machining a longitudinally extending side edge surface of a web plate having an upper and lower surface, comprising:
   providing a rotary cutter having cutting edges on a radially outer peripheral surface of said cutter which are at a predetermined angle *other than 90 degrees* with respect to the rotary axis of said cutter;
   orienting said cutter with respect to said web plate by having the rotary axis of said cutter inclined at a first angle [for] *other than 90 degrees to a plane containing the plane of said web plate, and* forming a second angle between the cutting edges and the longitudinal corner edge of the longitudinally extending side edge of said web plate to be machined, said second angle lying in a plane containing said longitudinally extending side edge surface and being within the range of 55 degrees to 125 degrees, and;
   rotating said rotary cutter in rotation, while moving said cutter and said web plate relative to each other for moving the longitudinally extending side edge surface of said web plate into contact with said radially outer peripheral surface of said cutter and past said cutter, whereby the longitudinally extending side edge surface of a web plate is machined.

4. A method of machining the side edge surface of a web plate having an upper and lower surface, comprising:
   providing a rotary cutter having cutting edges on the outer peripheral surface of said cutter which are at a predetermined angle *other than 90 degrees* with respect to the rotary axis of said cutter, said rotary axis of said cutter being inclined in a plane which is parallel to a desired machined edge surface of said web plate;
   orienting said cutter with respect to said web plate by having the rotary axis of said cutter inclined at a first angle [for] *other than 90 degrees to a plane containing the plane of said web plate, and* forming a second angle between the cutting edges and the longitudinal corner edge of the side edge of said web plate to be machined, said second angle being within the range of 55 degrees to 125 degrees, and;
   rotating said rotary cutter in rotation, while moving said cutter and said web plate relative to each other, for moving the side edge surface of said web plate past said cutter, whereby the side edge surface of a web plate is machined.

5. The method of claim 4, wherein said first angle is [formed between said rotary axis and the longitudinal corner edge of the side edge of said web plate to be machined, said first angle being] within the range of 5 degrees to 70 degrees.

* * * * *